United States Patent
Heijmans

(10) Patent No.: US 10,597,823 B2
(45) Date of Patent: Mar. 24, 2020

(54) CRUMB MADE OF PULP

(71) Applicant: TEIJIN ARAMID B.V., Arnhem (NL)

(72) Inventor: Rudy Heijmans, Arnhem (NL)

(73) Assignee: TEIJIN ARAMID B.V., Arnhem (NL)

( * ) Notice: Subject to any disclaimer, the term of this patent is extended or adjusted under 35 U.S.C. 154(b) by 776 days.

(21) Appl. No.: 14/888,881

(22) PCT Filed: May 2, 2014

(86) PCT No.: PCT/EP2014/058981
§ 371 (c)(1),
(2) Date: Nov. 3, 2015

(87) PCT Pub. No.: WO2014/177686
PCT Pub. Date: Nov. 6, 2014

(65) Prior Publication Data
US 2016/0083907 A1    Mar. 24, 2016

(30) Foreign Application Priority Data

May 3, 2013   (EP) ..................... 13166448

(51) Int. Cl.
| | | |
|---|---|---|
| *D21H 13/26* | (2006.01) | |
| *D21H 13/10* | (2006.01) | |
| *F16D 69/02* | (2006.01) | |
| *D21H 17/66* | (2006.01) | |
| *D21H 17/63* | (2006.01) | |
| *D21H 17/67* | (2006.01) | |
| *D21H 15/02* | (2006.01) | |
| *D21H 17/68* | (2006.01) | |
| *D01F 6/60* | (2006.01) | |

(52) U.S. Cl.
CPC ............ *D21H 13/26* (2013.01); *D21H 13/10* (2013.01); *D21H 15/02* (2013.01); *D21H 17/63* (2013.01); *D21H 17/66* (2013.01); *D21H 17/675* (2013.01); *D21H 17/68* (2013.01); *F16D 69/02* (2013.01); *D01F 6/605* (2013.01); *F16D 2200/0095* (2013.01)

(58) Field of Classification Search
CPC ......... D21H 13/02; D21H 13/10; D21H 13/26
See application file for complete search history.

(56) References Cited

U.S. PATENT DOCUMENTS

| | | | | |
|---|---|---|---|---|
| 4,492,779 A | * | 1/1985 | Junior | ....................... C08L 9/00 |
| | | | | 428/423.1 |
| 4,957,794 A | * | 9/1990 | Bair | ......................... D01G 1/00 |
| | | | | 162/146 |
| 5,641,444 A | | 6/1997 | Fujikawa et al. | |
| 2009/0029885 A1 | | 1/2009 | Conley et al. | |
| 2009/0101295 A1 | | 4/2009 | Merriman et al. | |

FOREIGN PATENT DOCUMENTS

| | | | |
|---|---|---|---|
| CN | 101550613 A | * | 10/2009 |
| CN | 102167869 A | | 8/2011 |
| EP | 0 191 127 A1 | | 8/1986 |
| JP | H1-097293 A | | 4/1989 |
| JP | 2012-197206 A | | 10/2012 |

OTHER PUBLICATIONS

Merriman, Kevlar Aramid Pulp for Paper Making, 1981, 1981 TAPPI Non-Woven Fibers and Binders Seminar Notes.*
Merriman E.A., Kevlar Aramid Pulp for Papermaking, TAPPI, 1981.*
Jul. 29, 2014 International Search Report issued in PCT/EP2014/058981.
Jul. 29, 2014 Written Opinion issued in PCT/EP2014/058981.

* cited by examiner

*Primary Examiner* — Anthony Calandra
(74) *Attorney, Agent, or Firm* — Oliff PLC

(57) ABSTRACT

An asymmetric crumb is described that includes 20 to 100 wt % of a para phenylene terephthalamide pulp. Also described are a process for manufacturing the crumb and a material including the crumb.

17 Claims, No Drawings

CRUMB MADE OF PULP

BACKGROUND

The disclosed embodiments pertain to a crumb made of 20 to 100 wt % of para phenylene terephthalamide pulp.

Products made of aramid are known.

In EP 0 191 127 a cake of synthetic fibrids is disclosed whereby the cake may comprise m-phenylene-terephthalamide. In the manufacturing process a slurry is pressed for hydroextraction and to form a plate-like cake. This cake is pulverized to form granules or flakes. The granules or flakes are pressed again to obtain a solid plate-like cake.

In JP 1097293 a method for producing a cake is disclosed, whereby an aramid fibrid slurry is compressed and the compressed product is crushed. The mentioned document has no indication of which kind of aramid is used.

In JP 2012197206 a slurry—containing also a small content of aramid fiber—is dehydrated for forming a raw plate.

US 2009/0101295 discloses a process for making pulp by using polypyridobisimidazole fibers. After a slurry is dewatered the obtained filter cake is wound up on rolls.

In US 2009/0029885 a process for making meta- and para-aramid pulp for use as reinforcement material is disclosed. The used slurry is dewatered and can be packed or wound up on rolls.

None of the mentioned products is made of para phenylene terephthalamide pulp (PPTA pulp) only. In addition, none of the references teach a method for producing a crumb being asymmetric.

SUMMARY

The disclosed embodiments pertain to a crumb comprising 20 to 100 wt %, of pulp, wherein the pulp consists essentially of para phenylene terephthalamide, and wherein the crumb is asymmetric.

DETAILED DESCRIPTION OF EMBODIMENTS

In the sense of the disclosed embodiments, a crumb is a breakable clump, e.g., of particles that are not sticky (that is, the particles are in the form of a powder and do not stick together and remain free from each other). A crumb has an irregular shape, whereby the shape is random and different crumbs have different shapes.

The crumb of the disclosed embodiments is asymmetric. Asymmetric means that within the crumb no symmetry axis, symmetry point or symmetry plane can be defined which would result in any form of symmetry within the individual crumb. Symmetry includes reflectional and rotational symmetry and self-symmetry. Therefore, no plane can be defined within the crumb which would divide the crumb and create a mirror image. Also, no axis can be defined around which the crumb can be rotated to result in the same image after any amount of rotation.

The crumb of the disclosed embodiments is a sort of porous aggregate comprising pulp. The crumb is different from gel, pellets, dough, powder, or paste, which are either regularly formed and therefore symmetric, or which are not shaped at all. Usually, the crumb of the disclosed embodiments has a higher surface area than a pellet, where surface area refers to the outer surface of the crumb or pellet. Also, usually the volume-to-surface ratio of the crumb of the disclosed embodiments will be lower than the volume-to-surface ratio of, e.g., a pellet which is of regular shape.

Even if the disclosed embodiments are directed to a single crumb it should be clear that a plurality of crumbs is also encompassed. Therefore, the terms "crumb" and "crumbs" are equivalently used in this specification.

The term "pulp consists essentially of para phenylene terephthalamide" means that the pulp used for the crumb is preferably free of other substances (preferably 1000 pure para phenylene terephthalamide pulp). However, this term also allows a very low content of other substances in the para phenylene terephthalamide pulp, whereby low content means 0.1 to 5 wt % of the PPTA pulp. Such a low content can be achieved by using recycled aramid for making the PPTA pulp. The term "other substances" may encompass other fibers, pulp and/or spin finish. Even if the pulp has a low content of other substances, a slurry obtained by the pulp is not a mixture of PPTA with, for example, meta-aramid.

The crumbs comprise pulp; this means that in the manufacturing process pulp is used for manufacturing the crumbs. To avoid misunderstandings, no fibrid material instead of pulp is used for making the crumbs. Fibrids are film-like particles with the ability to form a waterleaf. The waterleaf is a particle that has the ability, when a plurality of the said particles are deposited concomitantly with staple fiber from a liquid suspension upon a screen, to bond a substantial weight of said fibers by physical entwinement of the said particles with said fibers to give a composite waterleaf with a Canadian freeness number between 40 to 790. The term "fibrids" is not a synonym for fibers or pulp. Fibrids cannot be made from fibers or pulp because these are no longer in their plastic deformable stage. Fibrids can only be obtained directly from a dope or from a shaped structure by beating a liquid suspension of the shaped structure, which still must be in its plastic deformable phase, by an interfacial forming process; by adding a solution of a polymer to a precipitant for the polymer; or by using a fibridator, which provides a rotor generating shear. Crumbs made of fibrids instead of pulp have different properties in comparison to crumbs made of pulp. The filler retention, for example, is considerably lower for crumbs made of fibrids than for crumbs made of pulp. In addition to this, the filler retention of fibrids changes only slightly by mixing the fibrids, meaning fibrids cannot be "opened," in contrast to mixed crumbs.

Crumbs, as defined in the disclosed embodiments, have advantages in comparison to filter cakes, sheets or pellets (as described in the references). First of all, crumbs are easy to handle, meaning the transport and also the dosing is easier than with cakes or sheets. In the manufacturing process, no energy consuming process steps for pressing the crumbs are necessary (in comparison to the manufacturing of pellets or filter cake sheets).

The use of PPTA pulp for the crumbs results in a higher "holding together capability." The "holding together capability" of PPTA pulp is characterized by a high filler retention, which for PPTA pulp of Twaron® Type 1099 is, for example, in the range from about 60% to about 85%. In addition, the electrostatic properties of crumbs are lower in comparison with the electrostatic properties of pure pulp, and the handling during further processing steps is therefore easier. Also, the bulk density of crumbs is higher than that of pure pulp. The bulk density of pure pulp ranges from about 10 kg/m$^3$ for pulp in a fluffy state to about 110 kg/m$^3$ when the pulp is compressed during packaging in a bale for shipment to customers. The bulk density of crumbs ranges from about 140 kg/m$^3$ in an uncompressed state to about 500 kg/m$^3$ when an amount of crumbs is compressed for shipment to customers. Beside better handling properties, the higher bulk density also reduces costs for transportation to customers. In view of further processing, an automatic dosing system is usable due to the better handling properties of the crumbs (up to now, pure pulp must be dosed via manual work).

Filler retention is the characteristic of the pulp to hold other materials, especially filler material. Due to the filler retention of the PPTA pulp, the crumb may hold a high wt % of other fillers, which may be, together with the PPTA pulp, a component for a further article (made from PPTA pulp and the other material). In addition, a crumb made of PPTA pulp has a higher heat resistance in comparison to products made of meta-aramid material, meaning the crumb of the disclosed embodiments has other applications in addition to those of products made of meta-aramid material. Further, the crumb production is easier and has fewer processing steps than the production of the products described above. Due to their irregular shape, the crumbs are easy to produce (no mold is necessary). In contrast, the pellets of the above-described references require a specific shaping and pressure step.

Preferably, the crumb has dimensions of at most 3 cm×3 cm×3 cm. A crumb having these dimensions fits inside a cube of the dimension of 3 cm×3 cm×3 cm, without any part of the crumb being outside of the cube. That is, no part of the crumb sticks out of the cube. It should be clear that although the crumbs have an irregular shape, all crumbs have a maximum dimension. In other words, every crumb has a unique shape, but the overall dimension for all crumbs is regulated.

As a general minimum size, the crumb has dimensions of at least 0.1 cm×0.1 cm×0.1 cm.

Preferably, the crumb comprises 0 to 80 wt % of filler material, more preferably 20 to 70 wt %, and most preferably 40 to 50 wt % of filler material. It is further preferred that the crumb comprises 10 to 50 wt % of short fibers, more preferred 20 to 45 wt %, and most preferred 30 to 40 wt % of short fibers. It is also preferred that the crumb comprises 0.1 to 12 wt % of moisture, more preferred 1 to 10 wt %, even more preferred 3 to 8 wt %, and most preferred 4 to 6 wt % of moisture. The wt % values are based on the weight of the crumb itself.

In a preferred embodiment, the crumb (comprising filler material) has a filler retention of at least 20%, preferably a filler retention of 21 to 90%, more preferably of 25 to 80%, and most preferably of 30 to 60%.

Preferably, the bulk volume of the crumb is between 3 to 6 ml/g, more preferably between 4.0 and 5 ml/g, and most preferably between 4.4 and 4.6 ml/g. The bulk volume of the crumb is the volume of the crumb without a separate compacting step. A separate compacting step, for example, is a pressing step after a dewatering step, which is not used in the crumb manufacturing. The dewatering step itself (with or without pressure) is not a separate compacting step in the sense of the disclosed embodiments. A high bulk volume is preferred, because this means the pulp can be opened well.

Preferably, the jolting volume of the crumb is in the range of 1 to 5 ml/g, more preferably in the range of 2 to 3.5 ml/g, and most preferably in the range of 2.3 to 2.8 ml/g. The jolting volume describes the compacted volume of the crumb.

The values for the kaolin filler retention, the jolting volume, and the bulk volume depend on the applied filler material as well as the applied short fibers. Also, the amount (or the absence) of filler material and/or short fibers in the crumb influences the filler retention, the jolting volume, and the bulk volume. Nevertheless, the specified values are suitable for a crumb of the disclosed embodiments. If filler material and/or short fibers are used, the filler material and short fibers are specified as stated below and in the above-mentioned ranges to receive the mentioned kaolin filler retention, jolting volume and/or bulk volume.

Preferably, the crumb has a specific surface area in the range from about 1 to 15 $m^2/g$, more preferably in the range from about 3 to 10 $m^2/g$, and most preferably in the range of 5 to 8 $m^2/g$. The specific surface area SSA [$m^2/g$] is determined by the BET specific surface area method, wherein the adsorption of nitrogen is measured with the aid of a TRISTAR 3000 apparatus manufactured by Micrometrics. Before the BET measurement, the samples were dried at 200° C. for 30 minutes, under flushing with nitrogen.

Preferably, the filler material for the crumb is barium sulfate, calcium carbonate, mica, vermiculite, alkali metal titanates, molybdenum trioxide, cashew dust, rubber dust, graphite, metal sulfides, metal oxides, metal silicates, stone dust, chalk, diatom earth, powdered clay, glass powder, talc, kaolinite, kyanite, wollastonite, calcite, magnesium oxide, tin oxide, spinel, iron oxide and/or mixtures thereof. Due to the use of the mentioned filler material or mixtures thereof, the crumb is particularly suitable for making braking pads. For producing braking pads, a mixture of different materials in a specific ratio is used. All material and ratios can also be used for making the crumb. Again, due to the use of PPTA pulp, all mentioned filler materials (and/or short fibers) can be easily mixed with the pulp, and the pulp holds the filler material (and/or the short fibers) in the desired ratio.

In a preferred embodiment, the crumb also comprises short cut fibers (also referred to as short fibers). The short cut fibers have preferably an average length from 2 to 12 mm and/or preferably consist of para phenylene terephthalamide only. More preferably the average length of the short cut fibers is in the range from 3 to 8 mm and most preferably in the range from 3 to 6 mm. Average length means that at least 70%, more preferably at least 90% and most preferably almost 100%, of the short cut fibers have a length between the mentioned ranges. Preferably, Twaron® type 1080 from Teijin Aramid B.V, NL or Twaron® type D2075 from Teijin Aramid B.V, NL are used for the short cut fibers. Due to the addition of short fibers, the impact resistance of the crumb and also of the product made of the crumb increases. Surprisingly, the impact resistance increases, while the filler retention remains unchanged.

In one preferred embodiment, the crumb consists of para phenylene terephthalamide pulp, filler material and moisture only. This means no further material is mixed in the crumb. The PPTA pulp is a pure PPTA pulp as defined before. The suitable filler material is selected from the filler materials mentioned above. The moisture is preferably water.

In another preferred embodiment, the crumb consists of para phenylene terephthalamide pulp, filler material, moisture and short cut fibers only. This means no further material is mixed in the crumb. Also here the PPTA pulp is a pure PPTA pulp as defined before, and the suitable filler material is the filler material mentioned above only. Again, the moisture is preferably water. The short cut fibers are preferably only the short cut fibers mentioned above.

A further object of the invention pertains to a process for manufacturing a crumb. The process for manufacturing the crumb comprises at least the following steps:

a. a mixing step, whereby para phenylene terephthalamide pulp is mixed with water to obtain an homogenous slurry;

b. a dewatering step, whereby the slurry is guided through a dewatering device and water is removed to obtain a filter cake with a moisture content of 20 to 80 wt %; and
c. a breaking step, in which the filter cake is broken into crumbs of asymmetric shape.

For the manufacturing process, all definitions already given are also applicable.

When compared to a process to manufacture pellets, the process of the invention is more efficient, because no pressure during the specific shaping step is required. The filter cake is broken randomly, resulting in the irregularly shaped, asymmetric crumb of the disclosed embodiments.

This crumb has better dispersability than a pellet, especially when low mixing speeds are used to disperse the pellet or crumb. Therefore, during manufacture of the crumb and during use of the crumb, less energy is required for processing compared to pelletized pulp material. In summary, the crumb has advantageous properties when compared to pulp.

Preferably, in the mixing step filler material and/or short fibers are mixed with water and PPTA pulp. The filler material and/or the short fibers can be added during, before, or after the mixing of the PPTA pulp with water. In a most preferred embodiment, the filler material is added after the PPTA pulp and/or the short cut fibers are mixed with water.

Preferably, before or after the mixing step a refiner step occurs, whereby water and PPTA pulp, and optionally filler material and/or short fibers, are refined at least once.

In a preferred embodiment, the crumbs are dried in a drying step until the crumbs have a moisture content of less than 15 wt %. Preferably, the moisture content in the dried crumbs is in the range of 0.1 to 12 wt %, more preferably in the range of 1 to 10 wt %, even more preferably in the range of 3 to 8 wt %, and most preferably in the range of 4 to 6 wt %.

Preferably, the process for manufacturing a crumb comprises only the mixing step, dewatering step, breaking step and drying step. No further step for producing the crumb is necessary.

In another preferred embodiment, the process for manufacturing a crumb comprises only the mixing step, refiner step, dewatering step, breaking step and drying step. No further step for producing the crumb is necessary.

The crumb as described above is preferably used for friction material, gaskets, friction papers, and/or break pads.

The disclosed embodiments will now be described in detail with reference to the following example. The scope of the disclosed embodiments is not limited by this example at all.

Example

Crumb Manufacturing Process 1 kg of para phenylene terephthalamide pulp (Twaron® type 1099 sold by Teijin Aramid B.V, NL) and 1 kg of filler material are mixed with 200 l water for 5 minutes in a 300 liter tank with an inclined bottom and a Rushton impeller. The obtained slurry is guided to a horizontal filter, and water is pumped out of the slurry. By using a silicon cover, a vacuum is created and more water is extracted from the slurry to obtain a filter cake. This filter cake is broken into crumbs in a LÖDIGE high-shear mixer for one minute at a speed of 3000 min$^{-1}$. The obtained crumbs have a moisture content of about 70 wt % and are dried for 8 hours at 100° C. until the moisture content is between 5 and 6 wt %.

Kaolin Filler Retention

The kaolin filler retention [%] is determined as described in the following:

A mixture of 97 wt % Kaolin (LAUDE SP20) and 3 wt % of the sample to be tested (i.e., pulp or pulp+filler material and/or short cut fibers) is prepared on a high-speed vertical mixer. 20 g of said mixture are sieved on a riddle sifter device using a 250 mesh sieve. The remaining material on the sieve given as percentage of the initial amount is determined and is the kaolin filler retention [%]. If the sample to be tested contains filler material, the amount of filler material (Kaolin+filler material in sample) in the mixture is still 97%. For example, if the sample is a crumb with 50% filler material and 50% pulp, a mixture of 94% Kaolin and 6% of crumb is made.

Different crumbs comprising filler or no filler have been compared to pure pulp. For the measurement of the kaolin filler retention 60 gr of the obtained crumb made of PPTA pulp and filler material (as described above) is mixed with 940 gr of kaolin (Laude SP20) (*). Alternatively, 30 gr of crumb made of PPTA pulp only is mixed with 970 gr of kaolin (#). The blends are mixed for 4 minutes (TELLER 84 rpm, WIRBLER 2500 rpm) in an EIRICH mixer (type R02). 20 g of each of said mixtures are sieved on a riddle sifter device using a 250 μm mesh sieve (sifter device JEL200, sold by JEL). The remaining material on the sieve given as percentage of the initial amount is determined and is the kaolin filler retention [%]. The measurement is repeated for 500 and 710 μm sifter devices.

TABLE 1

| | Kaolin filler retention | | | |
|---|---|---|---|---|
| | Pulp type 1099 (#) | Pulp + vermiculite (*) | Pulp + graphite (*) | Pulp (comparative) (@) |
| Sieve 250 μm | 86.8% | 87.5% | 86.8% | 87.2% |
| Sieve 500 μm | 63.4% | 65.8% | 70.7% | 62.1% |
| Sieve 710 μm | 30.1% | 33.4% | 41% | 29% |

For #, crumbs made of PPTA pulp type 1099 only are used (no filler material was added).

For @, the pulp itself was measured. This means no crumb is made of the pulp.

It can be seen that in nearly all cases the filler retention of the crumb is better than the filler retention of the pulp itself.

Jolting Volume/Bulk Volume

Required Equipment:

Weighing unit (measurement range up to 100 g; preciseness±1 g)

Jolting volumeter STAV II incl. 250 ml measuring cylinder and 50 g jolting weight Bottle brush Funnel Little Scoop The bulk volume $V_{bulk}$ given in [ml/g] is determined as described in the following: A mixture of 97% of kaolin (LAUDE SP20) and 3% of the sample to be tested (3 wt % of crumb made of PPTA pulp only and 97 wt % of kaolin (#) or 6 wt % of crumb made of PPTA pulp with filler material and 94 wt % of kaolin(*)) is prepared on a high-speed vertical mixer. 30 g of said mixture is poured into a graduated cylinder and the bulk volume $V_{bulk}$ is calculated from the filling volume $V_{fill}$ [ml] according to equation: $V_{bulk}[ml/g]=V_{fill}[ml]/30 [g]$.

The jolting volume $V_{jolting}$ given in [ml/g] is determined as described in the following: After determination of the bulk volume, a jolt piston (50 gram) is applied carefully into the graduated cylinder on the surface of the 30 g sample, of which the bulk volume was determined, and the cylinder is fixed on a jolter. The jolting volume $V_{jolting}$ is calculated from the filling volume after 250 strokes, $V_{fill(250)}$ [ml], according to equation: $V_{jolting}$ [ml/g]=$V_{fill(250)}$ [ml]/30 [g].

TABLE 2

Jolting volume and bulk volume

|  | Pulp 1099 (#) | Pulp + vermiculite (*) | Pulp + graphite (*) | Pulp 1099 (comparative) (@) |
|---|---|---|---|---|
| Bulk volume [ml/g] | 4.56 | 4.45 | 4.59 | 4.33 |
| jolting volume [ml/g] | 2.35 | 2.34 | 2.78 | 2.11 |

As can be seen from table 2, the comparative sample (@, pulp was used in a pure form without making a crumb before) has a lower bulk volume than all crumbs (with or without filler material). This means that the crumbs (# or *) are better opened than the comparative example (@).

The invention claimed is:

1. A crumb comprising:
   20 to 100 wt % of a pulp,
   wherein:
      the pulp consists essentially of para phenylene terephthalamide, and
      the crumb is asymmetric and has a bulk volume of 3 to 6 ml/g.

2. The crumb according to claim 1, wherein the crumb has a dimension of at most 3 cm×3 cm×3 cm.

3. The crumb according to claim 1, further comprising:
   0 to 80 wt % of a filler material; and/or
   10 to 50 wt % of short fibers; and/or
   0.1 to 12 wt % of moisture.

4. The crumb according to claim 3, wherein the filler material is selected from the group consisting of barium sulfate, calcium carbonate, mica, vermiculite, alkali metaltitanates, molybdenum trioxide, cashew dust, rubber dust, graphite, metal sulfides, metal oxides, metal silicates, stone dust, chalk, diatom earth, powdered clay, glass powder, talk, kaolinite, kyanite, wollastonite, calcite, magnesium oxide, tin oxide, spinel, iron oxide and mixtures thereof.

5. The crumb according to claim 3, wherein the short fibers are aramid fibers having an average length of 2 to 12 mm.

6. The crumb according to claim 3, wherein the short fibers consist of para phenylene terephthalamide.

7. The crumb according to claim 3, wherein the crumb comprises 20 to 70 wt % of a filler material.

8. The crumb according to claim 1, wherein the crumb has a kaolin filler retention of at least 20%.

9. The crumb according to claim 1, wherein the crumb consists of the pulp, a filler material and moisture.

10. The crumb according to claim 1, wherein the crumb consists of the pulp, a filler material, moisture and short fibers.

11. The crumb according to claim 1, wherein the crumb has a specific surface area in a range of from about 1 to 15 m$^2$/g.

12. The crumb according to claim 1, wherein the crumb has a jolting volume in a range of from 1 to 5 ml/g.

13. A process for manufacturing the crumb according to claim 1, the process comprising:
   (a) mixing a para phenylene terephthalamide pulp with water to obtain a homogenous slurry;
   (b) removing the water from the slurry by guiding the slurry through a dewatering device to obtain a filter cake with a moisture content of 20 to 80 wt %; and
   (c) breaking the filter cake into crumbs of asymmetric shape and drying said crumbs to obtain the crumb according to claim 1.

14. The process according to claim 13, wherein in the mixing step, a filler material and/or short fibers are mixed with the water and the para phenylene terephthalamide pulp.

15. The process according to claim 13, further comprising, before or after the mixing step:
   refining the water and the para phenylene terephthalamide pulp, and optionally a filler material and/or short fibers, at least once.

16. The process according to claim 13, further comprising:
   drying the crumbs until the crumbs have a moisture content of less than 15 wt %.

17. A method of making a material comprising:
   obtaining the crumb of claim 1 and forming from said crumb the material from the group consisting of friction materials, gasket materials, and friction paper.

* * * * *

UNITED STATES PATENT AND TRADEMARK OFFICE
CERTIFICATE OF CORRECTION

PATENT NO. : 10,597,823 B2
APPLICATION NO. : 14/888881
DATED : March 24, 2020
INVENTOR(S) : Rudy Mathias Henricus Heijmans Page 1 of 1

It is certified that error appears in the above-identified patent and that said Letters Patent is hereby corrected as shown below:

In the Specification

At Column 2, Line 7, "1000" should be ---100%---.

Signed and Sealed this
Twelfth Day of May, 2020

Andrei Iancu
*Director of the United States Patent and Trademark Office*